United States Patent [19]
Mampaeij

[11] Patent Number: 4,618,179
[45] Date of Patent: Oct. 21, 1986

[54] METHOD OF UNLOADING A VESSEL BY MEANS OF A CRANE ARRANGED ON AN OFFSHORE PLATFORM AND A CRANE ADAPTED TO CARRY OUT THIS METHOD

[76] Inventor: Johannes J. Mampaeij, 98 Abeelstraat, 3329 AG Dordrecht, Netherlands

[21] Appl. No.: 646,528

[22] Filed: Sep. 4, 1984

[30] Foreign Application Priority Data

Feb. 14, 1984 [NL] Netherlands ........................ 8400467

[51] Int. Cl.4 ............................................ B64D 17/38

[52] U.S. Cl. ............................. 294/82.31; 294/82.27; 294/82.34

[58] Field of Search ............... 294/82.27, 82.24, 82.31, 294/82.34, 82.36, 905, 907; 24/230.5, 232, 233, 234, 235, 241 R, 241 P, 241 PP, 241 SP, 513; 114/252

[56] References Cited

U.S. PATENT DOCUMENTS 3,616,717 11/1971 Jones, Jr. ................................ 83/89
4,034,992 7/1977 Epstein ............................ 294/82.27
4,061,103 12/1977 Mampaey ........................... 114/252
4,077,661 3/1978 Inahashi .......................... 294/82.31
4,148,514 4/1979 McCullough .................... 294/82.34

FOREIGN PATENT DOCUMENTS 2634402 2/1977 Fed. Rep. of Germany .
2814805 10/1978 Fed. Rep. of Germany .
2559796 12/1980 Fed. Rep. of Germany .
984166 7/1951 France .
2169291 9/1973 France .
2211391 7/1974 France .
7504915 10/1975 Netherlands .
8302385 2/1984 Netherlands .
1463078 2/1977 United Kingdom .

*Primary Examiner*—James B. Marbert
*Attorney, Agent, or Firm*—Eugene E. Geoffrey

[57] ABSTRACT

A method and an apparatus for unloading a vessel by means of a crane fitted with a cargo hook, e.g. arranged on board an offshore platform, or on quay or the like. The tension in the cargo hook is continuously controlled and in case a predetermined tension is exceeded, the cargo hook having a quick-release is operated manually or automatically from the offshore platform, quay or the like.

4 Claims, 2 Drawing Figures

Figure 1:
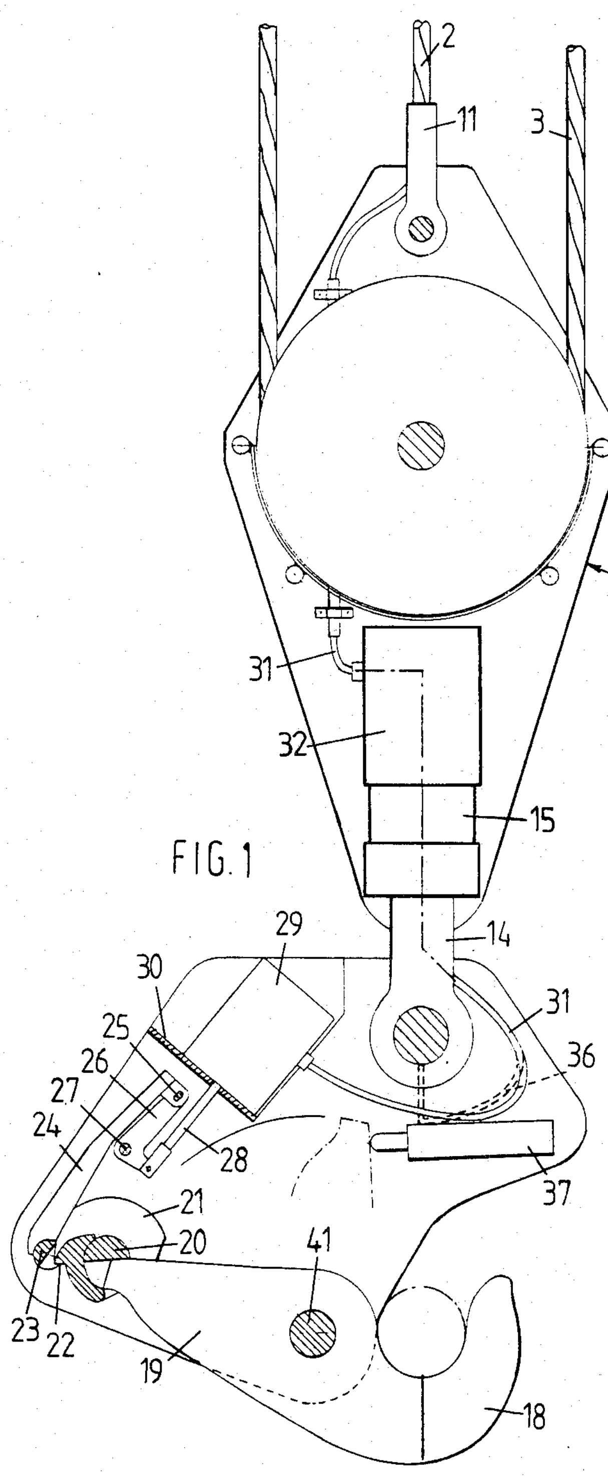

METHOD OF UNLOADING A VESSEL BY MEANS OF A CRANE ARRANGED ON AN OFFSHORE PLATFORM AND A CRANE ADAPTED TO CARRY OUT THIS METHOD

This invention relates to a method of unloading a vessel by means of a crane having a cargo hook, e.g. on board an offshore platform.

When unloading a vessel by means of a crane arranged on an offshore platform, problems frequently occur when unloading should take place in case of heavy seas. The tensions occurring thereby in the crane mostly result in that the crane or parts thereof break, so that highly dangerous situations may arise.

In the past, various efforts have been made to solve this problem. For instance, use has been made of cranes fitted with ropes incorporating breaking members. This gives an unsafe situation when the load is too heavy and the rope breaks: the broken rope flies through the pulleys and may be jammed, so that the crane jib breaks and/or the crane is swept overboard.

Efforts have also been made to solve the above problem by using so-called compensating wires to uniformly hoist the load. Since it is necessary to rig these wires with each load, there is a greater chance of making errors, so that likewise an unsafe situation may arise. The compensating wires stand a great chance of getting detached from the vessel to be unloaded. When compensating wires are used, it is not possible to unload a vessel under all circumstances; moreover, this method is complicated and hence vulnerable.

It has also been tried to solve this problem by using hydraulic compensating systems on the winch motors and drums. It has been found that these systems entail mostly technical problems, resulting in an unsafe working climate: the failure of one part may block the crane and/or release the drum, so that an uncontrolled situation arises.

It is an object of the invention to remove this drawback.

To this effect, a method of the above described type is characterized in that the tension in the cargo hook is continuously controlled and in case a specific tension is exceeded, the cargo hook fitted with a quick-release is operated from the off-shore platform. As a result of the manual operation, the cargo can be released by the operator at the desired moment, so that accidents can be minimized.

The invention further relates to a crane adapted to carry out the above described method, said crane being provided to this end with a standing part rope and a wire rope adapted to coact with a lower block to which a cargo hook is attached by means of a connecting piece having an axial bearing. Such a crane, which is well known on board offshore platforms, may be fitted according to the invention with a so-called quick-release which is remote controlled.

For inspecting the tension in the cargo hook, the connecting piece between the lower block and the cargo hook may be fitted with a force measuring member. In order to transmit the electrically measured force to a control panel on the offshore platform, the connecting piece may be fitted with a sliding ring unit.

For operating the quick-release of the cargo hook, the latter may be fitted with a lifting magnet having a core with a projecting rod, the free end of which coacts via a lever system with an operating lever of the quick-release.

For protecting the operating ropes for the force measuring member or the lifting magnet, the connecting piece may be internally provided with a passage.

The method and crane according to the invention provide a solution for the problem of the safe unloading of ships alongside offshore platforms. Although the foregoing description only refers to the unloading of a vessel by means of a crane having a cargo hook on board an offshore platform, it will be clear that the method and apparatus described can also be employed for the release of e.g. anchors: the latter is highly important in the case of an imminent calamity, e.g. a collision by an iceberg, ice bank or other floating obstacle.

Figure 2:
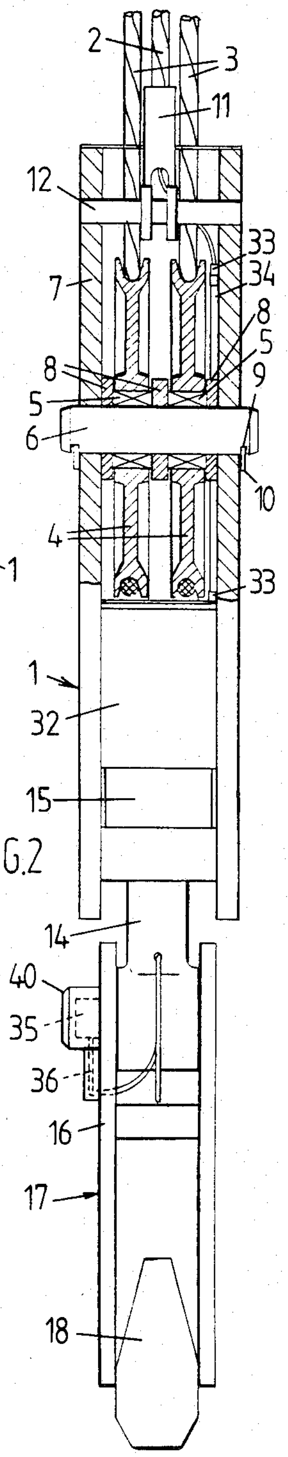

One embodiment of the hoisting crane portion fitted with a cargo hook according to the invention will now be described, by way of example, with reference to the accompanying drawing, in which:

FIG. 1 is a diagrammatic side view of a cargo hook fitted with a quick-release and FIG. 2 is a part-sectional front view of the cargo hook illustrated in FIG. 1.

As shown in the drawing, a boom, not shown, of a crane is connected to a lower block 1 by means of a standing part rope 2 and two wire ropes 3.

As appears more in particular from FIG. 2, the lower block 1 is fitted with two rope sheaves 4, each being mounted on a shaft 6 by means of a bearing 5. The hubs of the sheaves are kept spaced apart from each other and from side plates 7 by means of spacer rings 8. The side plates 7 and the shaft 6 are secured relatively to each other by strip 10 disposed in straight grooves 9 of the shaft, which are secured on the side walls 7 by means of bolts, not shown.

As further shown in the drawing, the one end of the standing part rope comprises a rope sleeve 11 the free end of which has a forked design. The prongs are fitted with passages adapted to receive a shaft 12, which is supported in the two side plates 7.

Between the side plates 7 adjacent the lower end, there is provided a support 13 through which extends a connecting rod 14 supported on the support 13 by means of an axial bearing 15, shown diagrammatically, so that the connecting rod can rotate.

The free lower end of the connecting rod is hub-shaped and connected by means of a measuring pin 40 to webs 16 of a cargo hook, indicated generally at 17.

The hook portion 18 proper is received between the webs of the cargo hook by means of a shaft 41.

The hook portion 18 comprises a locking arm 19 adapted to coact with a portion of the shaft 20 of a locking pin 21 received between the webs 16. The locking pin 21 is fitted with a boundary surface 22 adapted to coact with a stop 23, likewise rotatably mounted between the webs 15.

To the stop 23 there is furthermore affixed an operating lever 24 the other end of which is connected, by means of a slotted joint 25, not further shown, to a bell crank lever 26, which is rotatably mounted between the side plates through a shaft 27. The free end of the lever 26 is connected to a projecting rod 28 of a lifting magnet 29 mounted between the webs 16 of the cargo hook by means of a fixing plate 30.

The lifting magnet can be electrically operated by means of a cable 31 extending through a diagrammatically shown passage through the connecting piece 14 and the axial bearing 15 and is connected to a superimposed slip ring unit 32, whence the cable 31 extends upwardly along the inside of a side plate 7. Use is made here of a tube piece 34 provided on the inner wall of the plate by means of clamps 33. The electric cable 31 then extends upwardly through the wire rope 1 via a hole in the rope sleeve 11 and can thus be passed to an operating panel.

As further shown in the drawing, the measuring pin 40 comprises a measuring element 35, shown dotted, a signal conductor 36 of which extends through the side plate 15 and is combined with the electric conductor 31, thus extending to the operating panel.

The operation of the apparatus will be clear after the foregoing: as soon as the force exerted on the measuring pin becomes too high, and hence the load has to be released, a signal is transmitted to the lifting magnet from the operating panel. By retracting the projecting rod 28 thereof, the operating lever 24 will rotate, releasing the stop 23 from the boundary surface 22 and allowing the locking pin 21 to rotate under the influence of the force exerted thereon by the locking arm 19. For further details of the above described quick-release, reference is made to Dutch patent application No. 75.00971 or to the corresponding U.S. Pat. No. 4,061,103 of Applicant.

As further shown in the drawing, there is provided between the plates of the cargo hook a known per se recoil element 37 fitted with a spring, ensuring that the hook portion 18 proper automatically returns into the starting position after unloading: FIG. 1 shows the path of the locking arm 19 and the position at the recoil moment in dotted lines.

It will be clear that a great many modifications are possible without departing from the scope of the invention.

For instance, there may be arranged an electronic control unit in the electric portion of the operating panel in the crane cabin, said unit being responsive to a predetermined measuring signal of the hook, after which the signal is transmitted automatically or manually to the quick-release. Furthermore, the quick-release shown in the drawing can be operated by means other than a lifting magnet 29, e.g. hydraulic or pneumatic piston-and-cylinder assemblies.

Besides, the method and apparatus can be used for coupling and uncoupling anchor chains, ropes or the like, requiring a quick-release system. In such a case, the apparatus is to be adapted constructively to the requirements set for the application concerned.

What I claim:

1. In a crane for loading and unloading cargo, said crane including a cargo hook assembly comprising a block including cable pulleys rotatably carried by a pair of spaced parallel plates, a horizontally disposed bearing carried by said plates and disposed below said pulleys, a cargo hook structure including a vertically disposed shaft including means pivotally securing said shaft to said structure and extending upwardly through said bearing and affixed thereto to permit horizontal rotation of said structure, said structure further including a second pair of spaced parallel side plates, the lower portions of which are shaped to form a portion of a hook-like configuration, a hook portion pivotally mounted between the last said side plates at a point spaced inwardly from said hook-like configuration for movement about a horizontal axis from an outward load carrying position to an inward and downward load releasing position, an inwardly extending locking arm coupled to said hook portion and positioned between the last said side plates, releasable locking means between the last said side plates for holding said locking arm and hook portion in said load carrying position, and remotely controlled means carried by said assembly for releasing said locking means to permit movement of said hook portion from said load carrying position to said load releasing position.

2. In a crane according to claim 1 wherein said releasable locking means includes an electrically activated device and said crane includes an electric cable extending from a remote location to said assembly and through said block to said structure to permit operation of said locking means from said remote location.

3. In a crane, a cargo hook assembly according to claim 2 wherein said means pivoting said shaft to said assembly includes an electrical load measuring element, and means enabling connection of said element to indicating means positioned at said remote location for operation of said hook to permit release of said load either manually or automatically.

4. In a crane, a cargo hook assembly according to claim 1 wherein said means pivoting said shaft to said assembly includes a load measuring element, and means enabling connection of said element to indicating means positioned at said remote location for operation of said hook to permit release of said load either manually or automatically.

* * * * *